(12) United States Patent
Symonds et al.

(10) Patent No.: US 6,283,139 B1
(45) Date of Patent: Sep. 4, 2001

(54) REMOTE CONTROLLED HOSE VALVE

(75) Inventors: Randall R. Symonds; David A. Paul, both of Peoria; Scott Jacobs, Bloomington, all of IL (US)

(73) Assignee: L. R. Nelson Corporation, Peoria, IL (US)

(*) Notice: Subject to any disclaimer, the term of this patent is extended or adjusted under 35 U.S.C. 154(b) by 0 days.

(21) Appl. No.: 09/318,910

(22) Filed: May 26, 1999

(51) Int. Cl.[7] .................................................. F16K 17/36
(52) U.S. Cl. ............................ 137/78.3; 239/19; 239/69; 239/70; 251/129.04
(58) Field of Search ........................ 251/129.04; 239/69, 239/70, 64, 19; 137/78.3

(56) References Cited

U.S. PATENT DOCUMENTS

| | | | |
|---|---|---|---|
| 4,852,051 | * | 7/1989 | Mylne, III .............................. 364/420 |
| 4,892,113 | * | 1/1990 | Fattahi ................................. 137/78.3 |
| 5,135,168 | * | 8/1992 | Wang ..................................... 239/70 |
| 5,137,257 | * | 8/1992 | Tice ................................. 251/129.11 |
| 5,465,904 | * | 11/1995 | Vaello ................................... 239/69 |
| 5,546,974 | * | 8/1996 | Bireley ................................ 137/78.3 |
| 5,813,655 | | 9/1998 | Pinchott et al. ................. 251/129.04 |
| 5,921,280 | * | 7/1999 | Ericksen et al. ................ 137/624.11 |

OTHER PUBLICATIONS

Micro Process Applications (Literature), 1998.
Electronic Industrial Controls, Inc. (Literature), 1998.
Solatrol Incorporated (Literature), 1998.

* cited by examiner

*Primary Examiner*—A. Michael Chambers
(74) *Attorney, Agent, or Firm*—Mayer, Brown & Platt

(57) ABSTRACT

A remote controlled hose valve system for use with a water source and a hose having one end connectable to a fluid activated device and an opposite connector end is disclosed. The hose valve system includes a valve unit and a remote control unit. The valve unit has an inlet coupler connectable to the water source. The valve unit also has a hose coupler coupled to the opposite connector end of the hose. A conduit allows fluid flow between the inlet coupler and the hose coupler. A valve is located in the conduit and permits fluid flow in the conduit. An actuator which may be an electric motor is connected to the valve. A power source is provided for the actuator. A signal receiver is coupled to the power source and the actuator. The receiver allows power flow to the actuator to close or open the valve in response to a unique signal. The remote control unit includes a transmitter which sends a unique signal to open or close the valve.

24 Claims, 12 Drawing Sheets

REMOTE CONTROLLED HOSE VALVE

FIELD OF INVENTION

This invention relates to a remote controlled hose valve. More specifically, this invention relates to a valve which is activated by a remote control to control the magnitude of water flow.

BACKGROUND OF INVENTION

A common method for watering an area such as a lawn involves using a garden hose with a sprinkler. The sprinkler is fluidly driven and distributes water in a certain geometric pattern. Examples of sprinklers include an oscillator arm sprinkler type or a spray pattern irrigation device. The garden hose is connected to a spigot which supplies water under pressure. The proportion of the water flow from the spigot may be regulated by turning a knob.

A user typically attaches one end of the hose to the spigot, attaches the sprinkler to the other end of the hose and places the sprinkler in the area desired to be watered. The user then turns on the water flow from the spigot by turning the knob. The water flow is forced through the hose and distributed by the sprinkler to the desired area. In this manner, areas which are distant from the spigot may be watered. By regulating the flow rate from the spigot, the user may also alter the speed of the sprinkler and the pattern it follows in watering the area.

After the sprinkler is set up in the desired location, the user is free to attend to other tasks while the area is watered.

This method provides an inexpensive alternative to a permanent irrigation system, which requires the time and expense of laying underground pipes and connecting sprinkler head units. Additionally, a user may move the sprinkler to the areas where watering is needed. However, compared to permanent irrigation systems, this method is much more labor intensive, especially for large areas.

Another problem with a portable sprinkler system is adjusting the water flow for a particular area of coverage. When full water pressure is available to the sprinkler, the sprinkler will provide the maximum geometrical area of coverage based on its design. In many cases, the user spends a great amount of time adjusting the sprinkler for a desired smaller area. This adjustment requires walking to the water spigot and making a flow rate adjustment and walking back to the sprinkler to observe the new water coverage area. This is especially inconvenient when the sprinkler is out of eyesight from the water source.

Finally, the amount of time and thus the amount of water that the sprinkler irrigates must be monitored by the user. In order to insure a uniform watering and to prevent overwatering, a user must turn off the spigot at an appropriate time. However, a user may forget to do so, resulting in overwatering.

Thus, there exists a need for a remote controlled valve which will allow interruption of the water source from a remote location. There is also a further need for a remote controlled valve which allows regulation of water flow. There is also a need for a remote controlled valve which may be automatically shut off after a preset time interval. There is a further need for a handheld remote control device which allows a user to incrementally actuate a valve. Finally, there is a need for a programmable remote controller to regulate the flow of water from the water source.

SUMMARY OF THE INVENTION

The present invention is embodied in a remote controlled hose valve system for use with a water source and a hose having one end connectable to a fluid-activated device and an opposite connector end. The hose valve system has a valve unit. The valve unit has an inlet coupler connectable to the water source and a hose coupler coupled to the opposite connector end of the hose. A conduit allows fluid flow between the inlet coupler and the hose coupler. A valve is located in the conduit and permits fluid flow in the conduit. An actuator is connected to the valve. A signal receiver is coupled to a power source and the actuator. The receiver allows power flow to the actuator to close or open the valve in response to a unique signal. A remote control unit includes a transmitter which sends a unique signal to open or close the valve.

The invention is also embodied in a remote controller for activating a multi-position valve to direct or block water flow from a water source to a hose. The valve is coupled to an actuator which responds to command signals. The remote controller includes a signal transmitter and a frequency oscillator coupled to the signal transmitter. A user input is coupled to a processor. The user input provides activation of the processor to send a signal modulated by the frequency oscillator to control the position of the valve.

Another embodiment of the present invention is a remote controlled hose valve system for use with a water source and a hose having one end connectable to a fluid activated device and an opposite connector end. The system has a valve unit with an enclosed watertight compartment. The valve unit has an inlet coupler connectable to the water source and a hose coupler coupled to the opposite connector end of the hose. A conduit allows fluid flow between the inlet coupler and the hose coupler. A ball valve is located in the conduit and is rotatable to permit fluid flow in the conduit. A motor has a rotatable shaft coupled to the ball valve. A signal receiver is coupled to the motor, the receiver allows power flow to the motor to rotate the ball valve in response to a unique signal. The system also includes a remote control unit which has a user input allowing a user to open or close the ball valve. A transmitter is coupled to the user input which sends a unique signal to open or close the valve.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
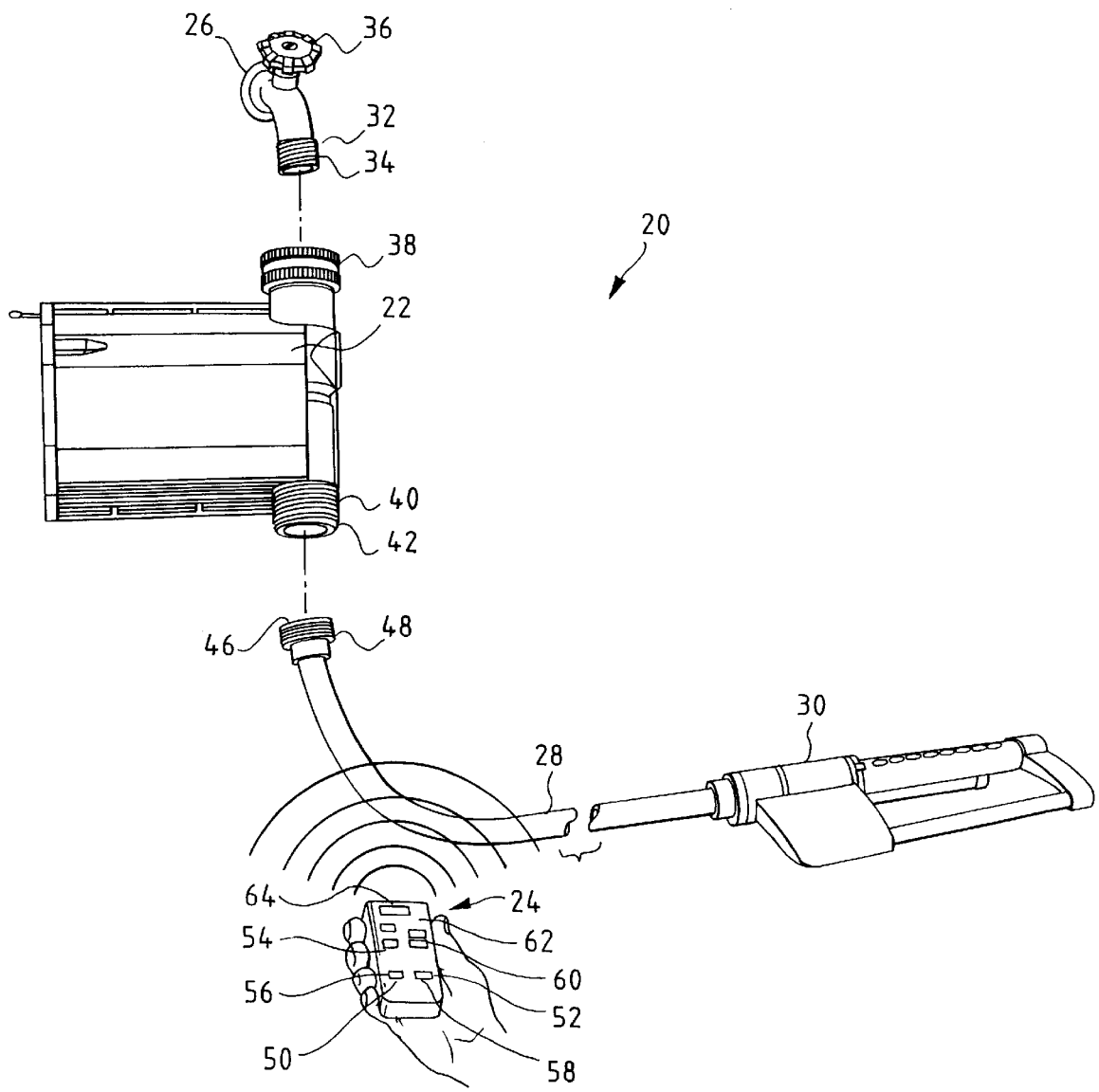
FIG. 1 is a perspective view of a hose valve unit and a remote controller according to the present invention.
Figure 2:
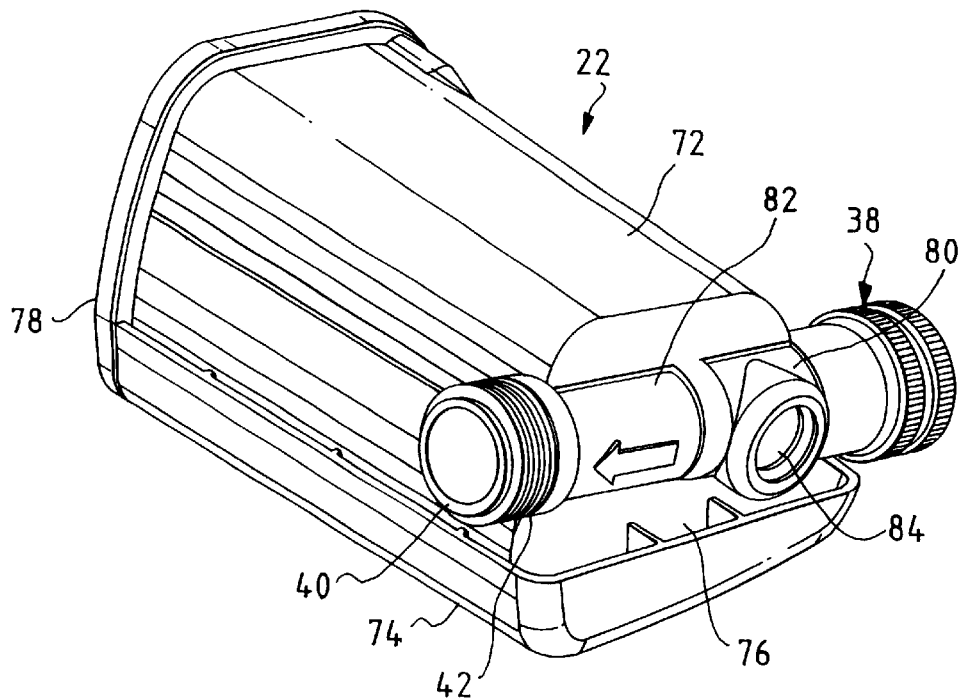
FIG. 2 is a perspective view of the hose valve unit in FIG. 1.
Figure 3:
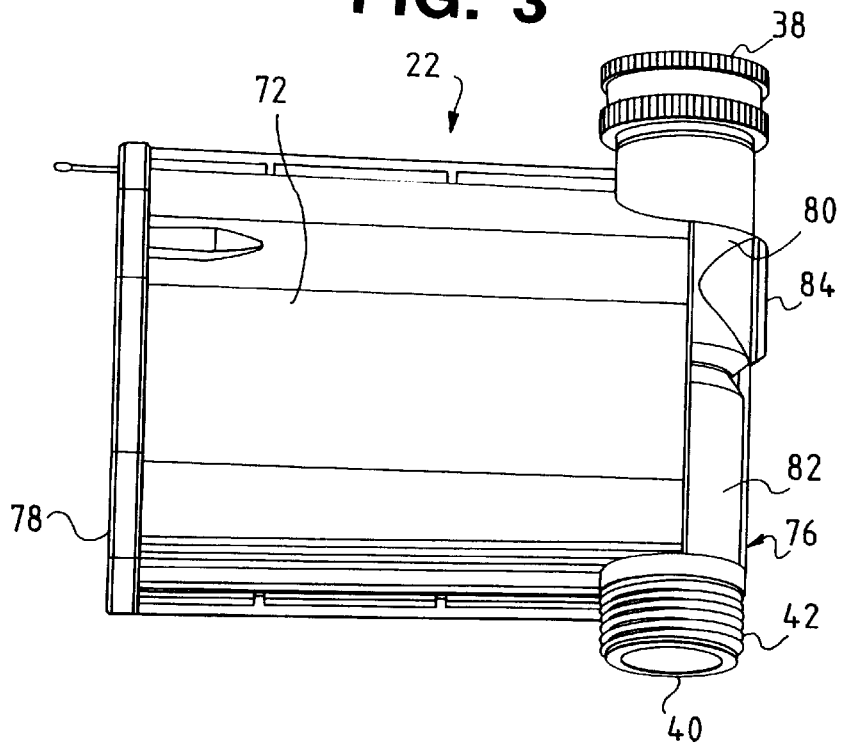
FIG. 3 is a side view of the hose valve unit in FIG. 1.
Figure 4:
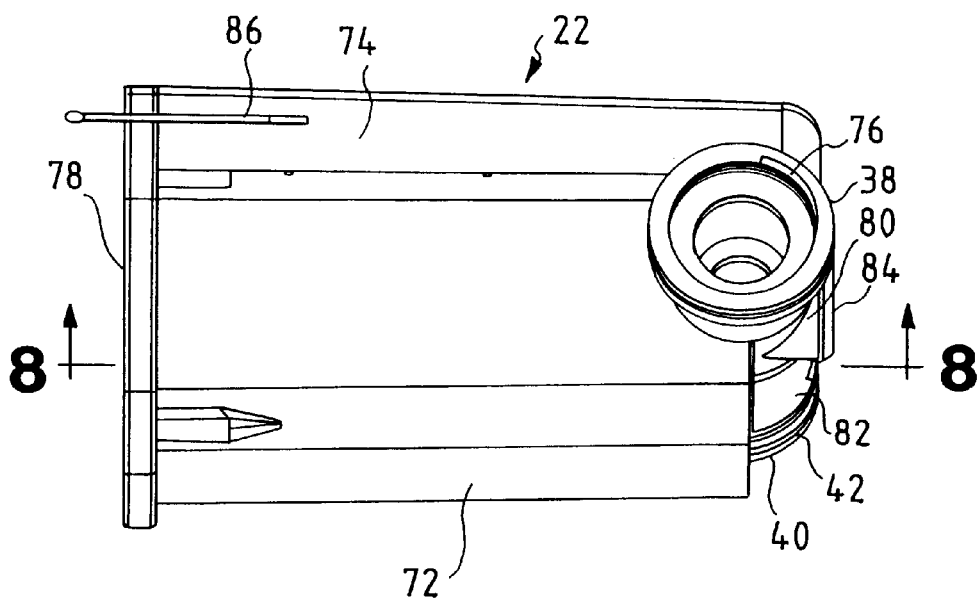
FIG. 4 is top view of the hose valve unit in FIG. 1.
Figure 5:
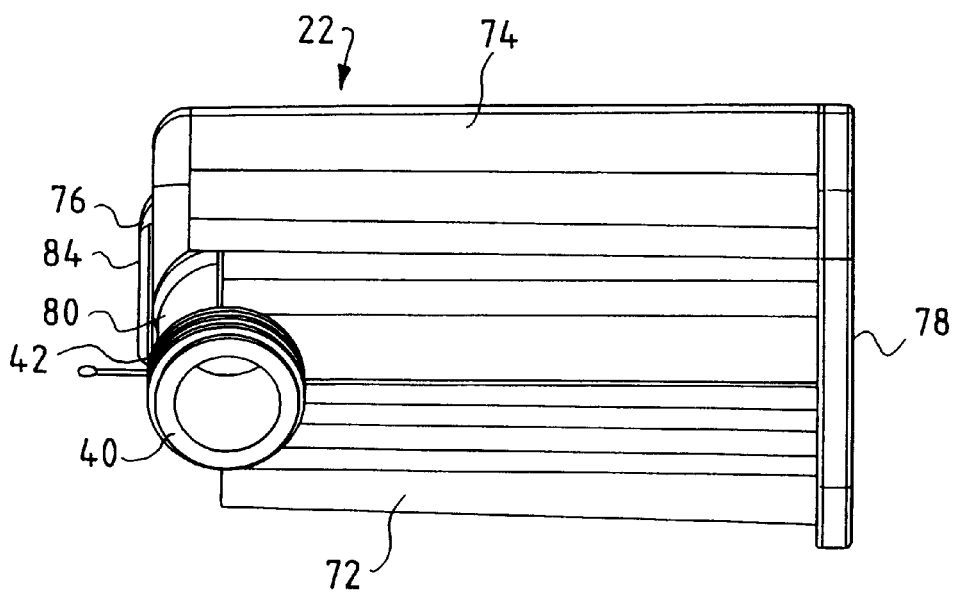
FIG. 5 is bottom view of the hose valve unit in FIG. 1.
Figure 6:
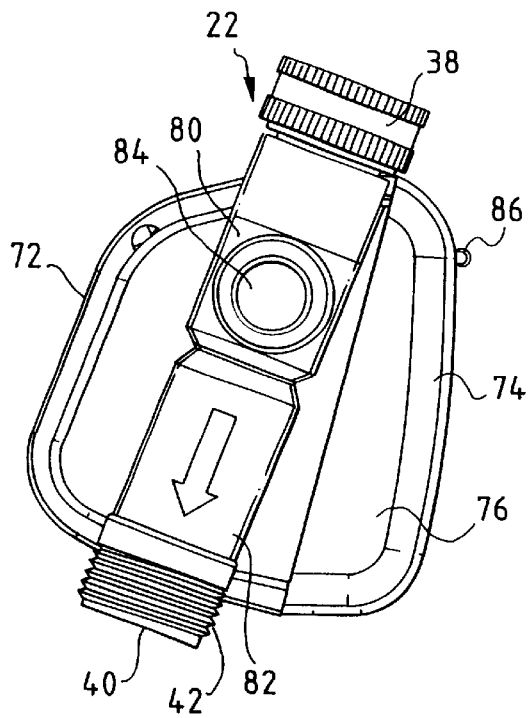
FIG. 6 is a valve end view of the hose valve unit in FIG. 1.
Figure 7:
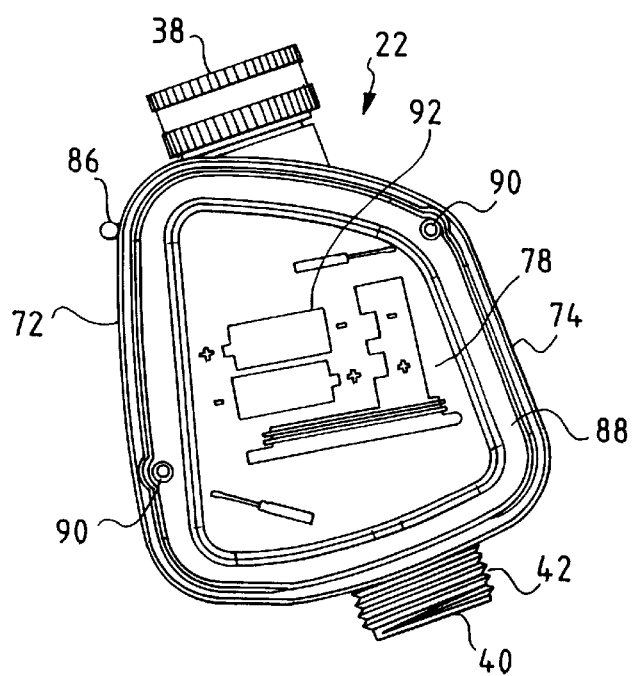
FIG. 7 is a battery end view of the hose valve unit in FIG. 1.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings and more particularly to FIG. 1, which shows a perspective view of a remote controlled hose valve system generally indicated at 20, embodying the general principles of the present invention. In general, the system 20 includes a hose valve unit 22 which is activated by a remote controller unit 24. The hose valve unit 22 is fluidly connectable to a hose spigot 26. The hose valve unit 22 is also fluidly connectable to one end of a hose 28. The other end of the hose 28 may be connected to a sprinkler 30 or any other fluidly activated device.

The hose spigot 26 has a male coupler 32 which has a series of threads 34. The water flow from the hose spigot 26 is controlled by a rotatable knob 36. The male coupler 32 is coupled to an inlet coupler 38 on the hose valve unit 12. The inlet coupler 38 has a cylindrical body with a series of interior threads 40 which mate with the threads 34 on the male coupler 32. The inlet coupler 38 is screwed on the male coupler 32 to cause pressure against a washer (not shown) creating a watertight seal.

Water from the spigot 26 flows into the inlet coupler 38 through the hose valve unit 22 and out an outlet 40 which is located on the hose valve unit 22 opposite the inlet coupler 38. The outlet 40 is cylindrical in shape and has a series of exterior threads 42. The exterior threads 42 are matable to a series of threads 46 on the interior surface of a coupler 48 on the hose 28. The coupler 48 and the outlet 40 in conjunction with a washer (not shown) form a sealed conduit for the flow of water from the hose valve unit 22 through the hose 28.

The remote controller 24 is a size suitable to be held in a user's hand and has a top surface 50. The top surface 50 has a key pad 52 with an on/increase flow control key 54, a decrease flow key 56, a one-minute increment key 58, a fifteen-minute increment key 60, and a clear/stop control key 62.

The keys 54–62 allow a user to use the remote controller unit 24 to control the hose valve unit 22. Pressing the on/increase flow control key 54 allows a user to activate water flow through the hose valve unit 22. Subsequent depression of the control key 54 allows the water flow to be increased through the hose valve unit 22. Pressing the decrease flow key 56 decreases the water flow through the hose valve unit 22. The increment keys 58 and 60 allow a user to program in one-minute and fifteen-minute increments the amount of time water flows through the hose valve unit 22. The programming may be confirmed by an LCD display 64 which displays various information which will be described below.

In the preferred embodiment, the remote unit 24 allows a maximum on time for water flow of three hours. Of course, longer or shorter maximum times may be programmed if desired. Finally, the off/clear control key 62 halts the flow of water through the hose 28 from the hose valve unit 22 and clears any timer settings.

FIGS. 2–7 show different views of the hose valve unit 22. The hose valve unit 22 is formed by a front side semi-cylindrical outer enclosure 72 which is joined with a mating, semi-cylindrical outer backside enclosure 74. The enclosures 72 and 74 are constructed of durable and watertight material such as plastic. A valve end 76 and a battery-access end 78 in conjunction with the enclosures 72 and 74 form the hose valve unit 22.

The valve end 76 holds a valve compartment 80 and a water conduit 82, which fluidly connects and provides fluid access between the water inlet 28 and the outlet 40. The valve compartment 80 has a valve plug 84 that may be removed to allow access to the valve compartment 80.

The back side enclosure 74 also has an antenna 86 which receives signals from the remote control unit 24 in FIG. 1. The battery end 78 has a battery access cover 88, which is secured to the hose valve unit 22 via a pair of screws 90. The access cover 88 may contain an instructional graphic 92 which instructs a user in the installation of batteries in the hose valve unit 22.

Figure 8:
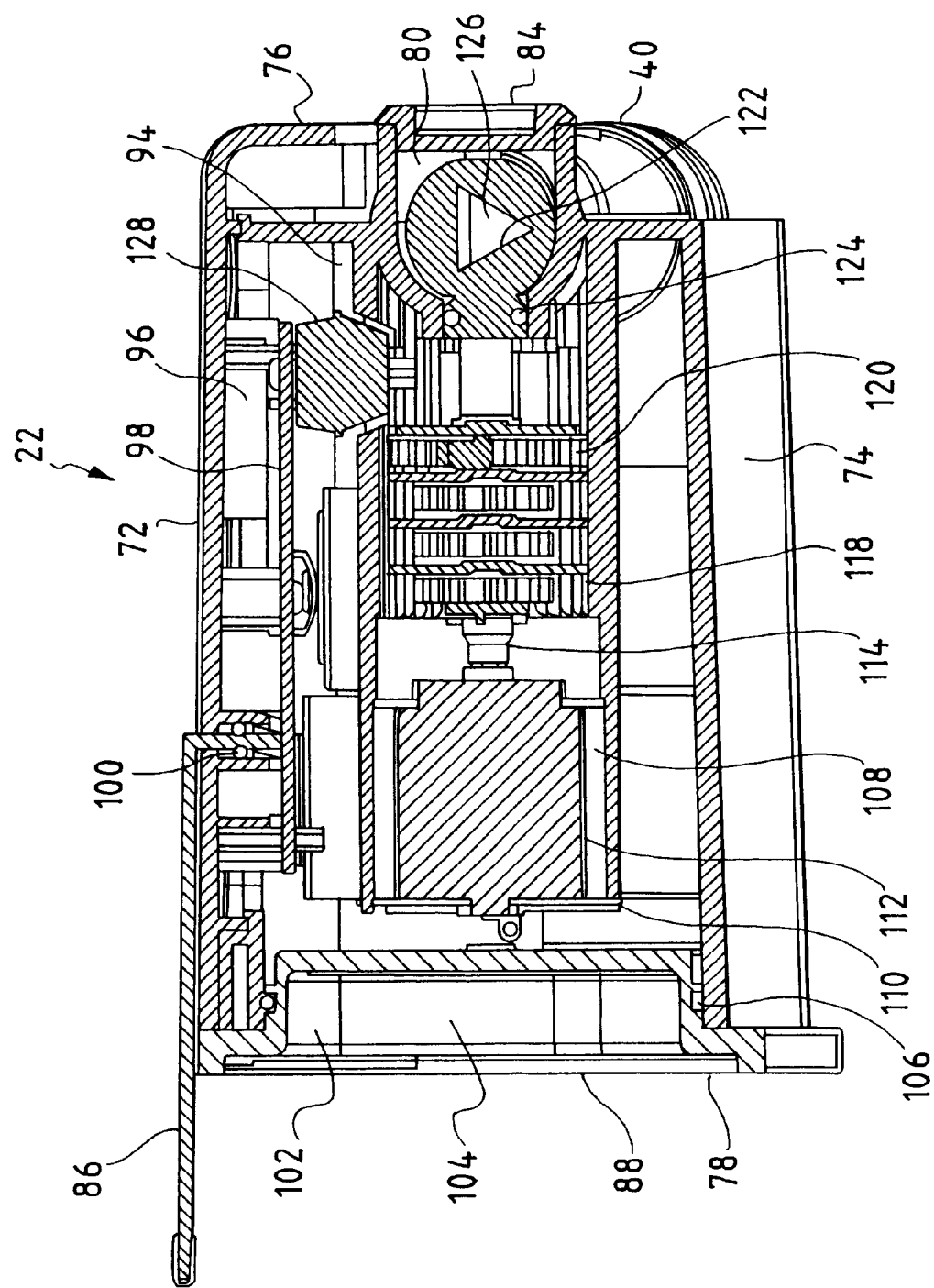
FIG. 8 is a cross sectional view of the remote controlled hose valve unit of FIG. 1 taken along the line 8–8.

FIG. 8 shows a cutaway view of the hose valve unit 22 along the lines 8–8' in the previous FIGS. 2–7. An interior compartment 94 of the hose valve unit 22 is formed by the side enclosures 72 and 74 and the ends 76 and 78. The interior compartment 94 is further subdivided into a number of watertight compartments. The interior compartment 94 has a circuit compartment 96 which holds a printed circuit board 98 near the front side enclosure 72. The antenna 86 is attached to the circuit board 98 through a watertight seal 100 which is an O-ring. Of course, the antenna 86 may be integral to the circuit compartment 96 instead.

The interior 94 also has a battery compartment 102, which holds a pair of batteries 104 for power to the hose valve unit 22. The batteries 104 may be any appropriate voltage range. In the preferred embodiment, a three-volt power source is used. The battery compartment 102 is sealed with an O-ring 106.

A motor compartment 108 with a motor cover 110 holds a valve actuator 112, which is an electric motor in the preferred embodiment. The motor compartment 108 rests under the circuit compartment 96 and is water sealed from the valve compartment 80. The valve actuator 112 turns a sun gear 114. The sun gear 114 turns a series of four carrier gears 118. A final carrier gear 120 is coupled to a valve such as ball valve 122. The series of carrier gears 118 allows the final carrier gear 120 to be turned at a slow rotation rate by the actuator 112. The carrier gear 120 has an O-ring 124 to seal it from the valve 122.

The ball valve 122 is located in the middle of the water conduit 82. The ball valve 122 in conjunction with the actuator 112 is used to shut off or allow water flow through the water conduit 82. The ball valve 122 has an axial conduit 126. The axial conduit 126 employs a non-circular opening designed to approximate proportional flow control. The opening increases the amount of flow control over circular openings, which may be used as well. In the preferred embodiment a triangular opening is used, although other non-circular shapes may be used. The valve 122 is opened and closed by rotating the axial conduit 126 in or out of alignment with inlet 30 and outlet 40. A limit switch 128 is coupled to the ball valve 122 which cuts off power to the actuator 112 when the ball valve 122 is fully open or closed.

Of course, other types of motors such as a stepper motor may be used for the actuator 112. Additionally, other types of valves such as a dual solenoid push-pull diaphragm valve may be used for the ball valve 122.

Figure 9:
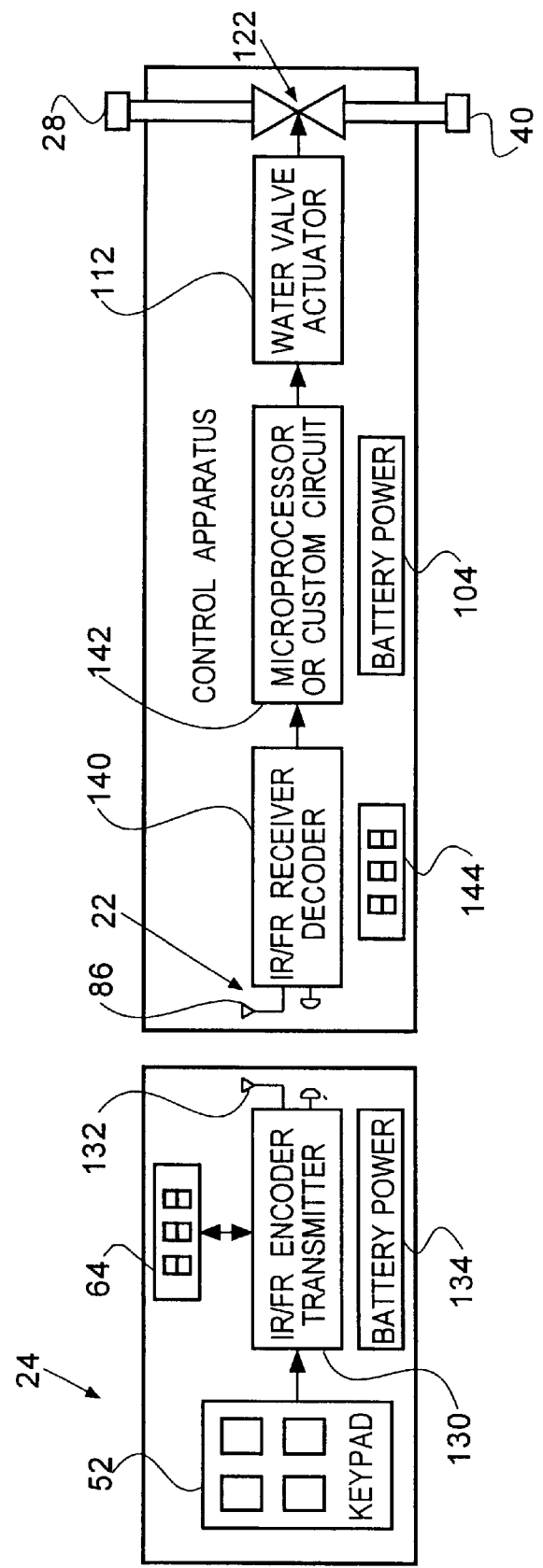
FIG. 9 is a block diagram of the remote controller and hose valve unit according to the present invention.

FIG. 9 is a block diagram of the remote controller 24 and the hose valve unit 22. The remote control unit 24 accepts user inputs from the keypad 52. The keypad 52 sends command signals to an encoder transmitter 130 which is coupled to an antenna 132. The antenna 132 is integral to the remote control unit 24. The encoder transmitter 130 is powered by a battery unit 134. The encoder transmitter 130 is also coupled to the display 64.

In the preferred embodiment, the encoder transmitter 130 transmits radio frequency signals. However, other types of signals may be used to activate and control the hose valve unit 22. For example, an infra-red signal may be used with the appropriate modifications to the encoder transmitter and the hose valve unit receiver.

The signals from the remote control unit 24 are received by the antenna 86 which is attached to a receiver/decoder 140 on the hose valve unit 22. The decoded signal is interpreted by a control unit 142. The control unit 142 is coupled to the water valve actuator 112. The control unit 142 generates signals which will activate the ball valve 122 to allow or prevent water flow between inlet 38 and outlet 40, as will be explained below. The control unit 142 also may be coupled to an optional display driver unit 144 which provides signals to an optional LCD display. The optional LCD display may be used in conjunction with the display 64 on the remote control unit 24. Alternatively, the remote control unit 24 may only have an LED instead of display 64. The LED then indicates that signals are being sent to the hose valve unit 22. In this alternative, the optional LCD display on the hose valve unit 22 may be programmed to show elapsed watering time, the time the valve unit 22 will be activated, or other information.

Figure 10:
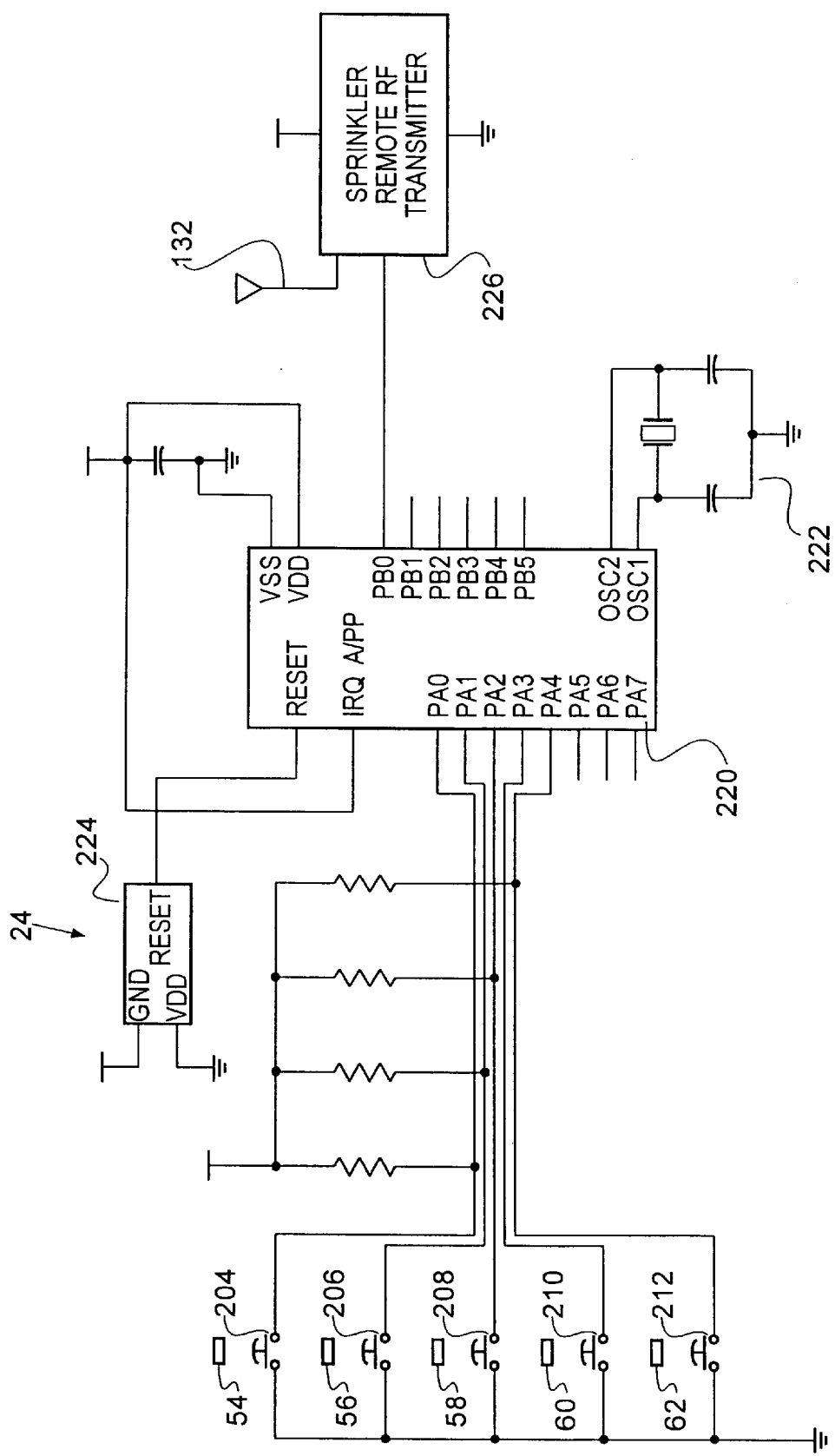
FIG. 10 is a circuit diagram of the remote controller of the present invention.

FIG. 10 is a circuit diagram of the remote control unit 24. The on/increase flow key 54 is coupled to a contact switch 204. The decrease flow key 56 is coupled to a contact switch 206. The increment one-minute key 58 is coupled to a contact switch 208. The increment fifteen-minute key 60 is coupled to a contact switch 210. The clear/stop key 62 is coupled to a contact switch 212.

The contact switches 204–212 are coupled to a processor 220 which processes the input from the switches 204–212 to produce an output signal. The processor 220 in the preferred embodiment is a Motorola Model HC68HC705, although any suitable microprocessor or microcontroller may be used. The contact switches 204–212 are activated by depressing the keys 54–62 respectively, causing a voltage signal to be connected to the inputs of the processor 220.

A clock circuit 222 is coupled to the processor 220. A reset circuit 224 is also coupled to the processor 220 to clear the internal memory of the processor 220 on power up of the system. The processor 220 provides a data output to an RF transmitter circuit 226. The RF transmitter circuit 226 is coupled to the antenna 132.

Figure 11:
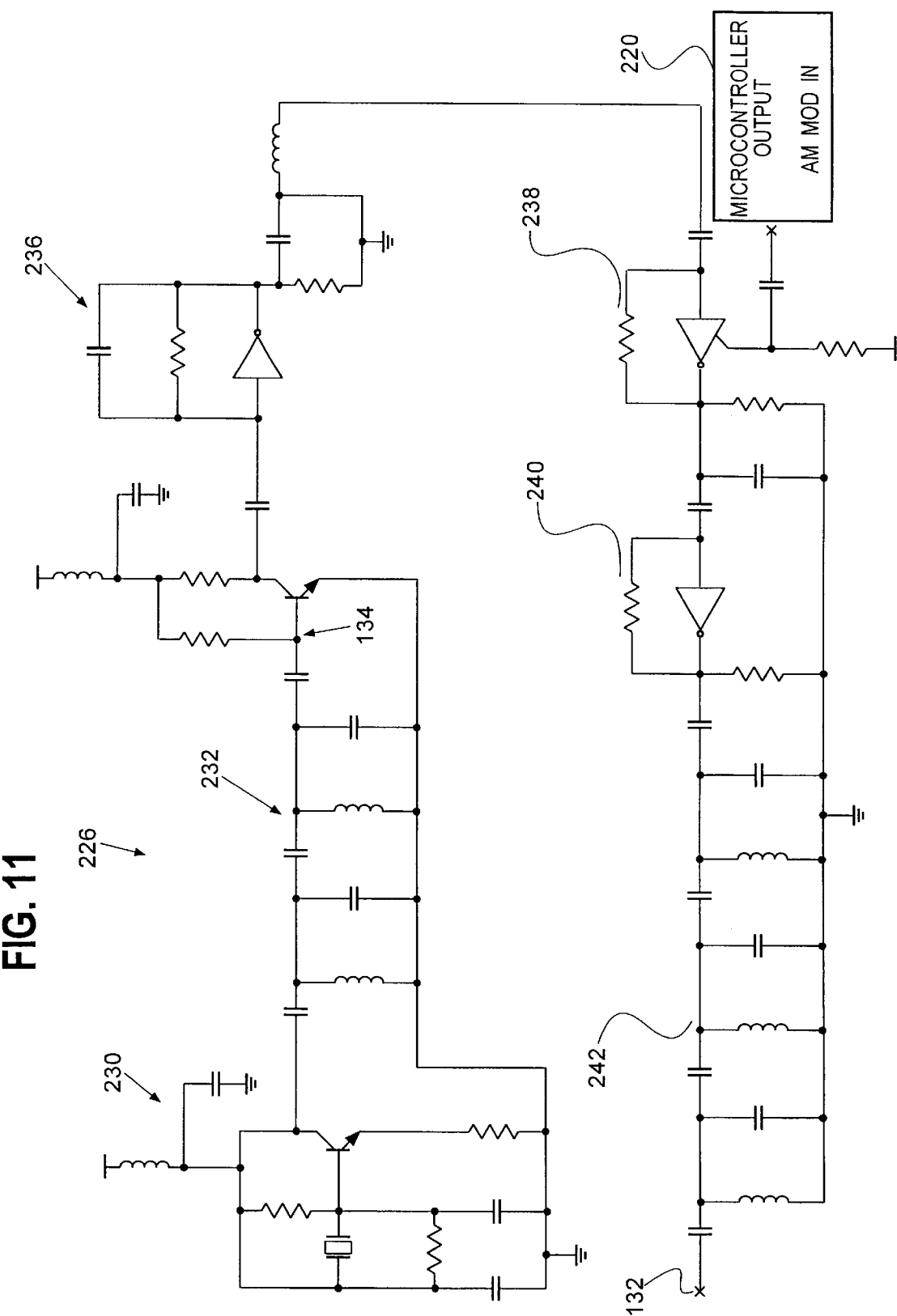
FIG. 11 is a circuit diagram of the transmitter in the remote controller of FIG. 10.

FIG. 11 is a circuit diagram of the RF transmitter circuit 226. A Pierce oscillator circuit 230 sets the frequency of the transmitted signal. The oscillator circuit 230 produces a carrier signal which is coupled to a filter circuit 232. The carrier signal is then input into a gain circuit 234. The gain circuit 234 is coupled to a first multiplier circuit 236. The multiplier circuit 236 is coupled to a second multiplier circuit 238.

The second multiplier circuit 238 includes the signal input from the processor 220. The processor 220 outputs a coded signal which is modulated by the carrier signal. The second multiplier circuit 238 produces a modulated signal and is coupled to a third multiplier circuit 240. The third multiplier circuit 240 is coupled to a filter 242 which sends the signal to the antenna 132.

The remote control unit 24 may be used as a countdown timer by which the processor 220 counts down in minute increments the programmed time input by the keypad 52. The processor 220 reads the input times and actuates the valve 122 into an open position. The user may program the amount of desired irrigation time in fifteen and one minute increments by using the timer keys 58 and 60. Once the time expires, the processor 220 shuts the valve 84 by powering the valve actuator 112. In this manner, a user may program the valve unit 22 for irrigation for only a certain period of time.

The remote control unit 24 also allows the user to control the flow of water. By pressing flow key 54 or 56, the user may turn the ball valve 122 by an increment thus incrementally increasing or decreasing the flow of water through the ball valve 122.

Figure 12A:
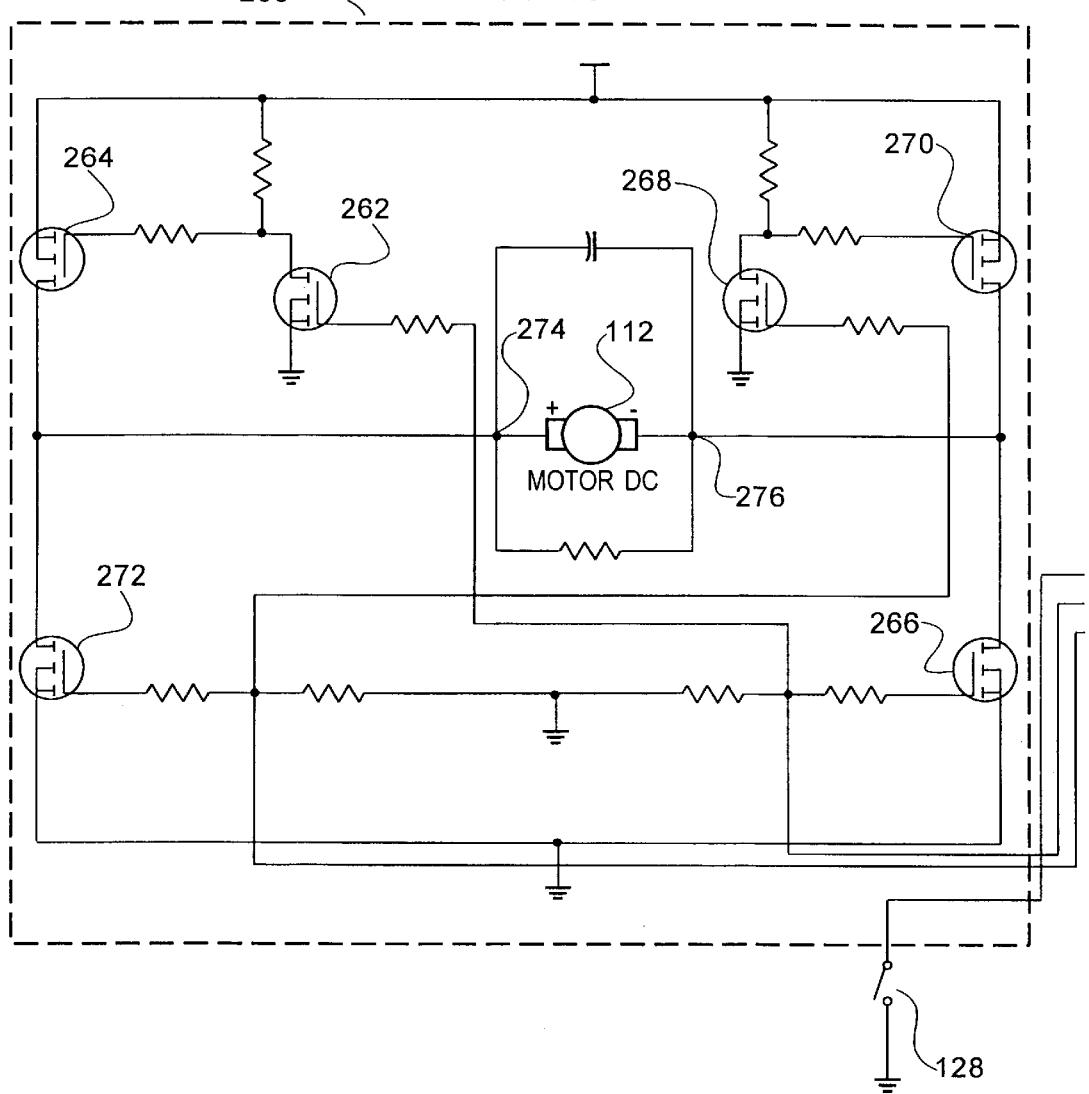
FIGS. 12A and 12B are a circuit diagram of the hose valve unit of the present invention.
Figure 12B:
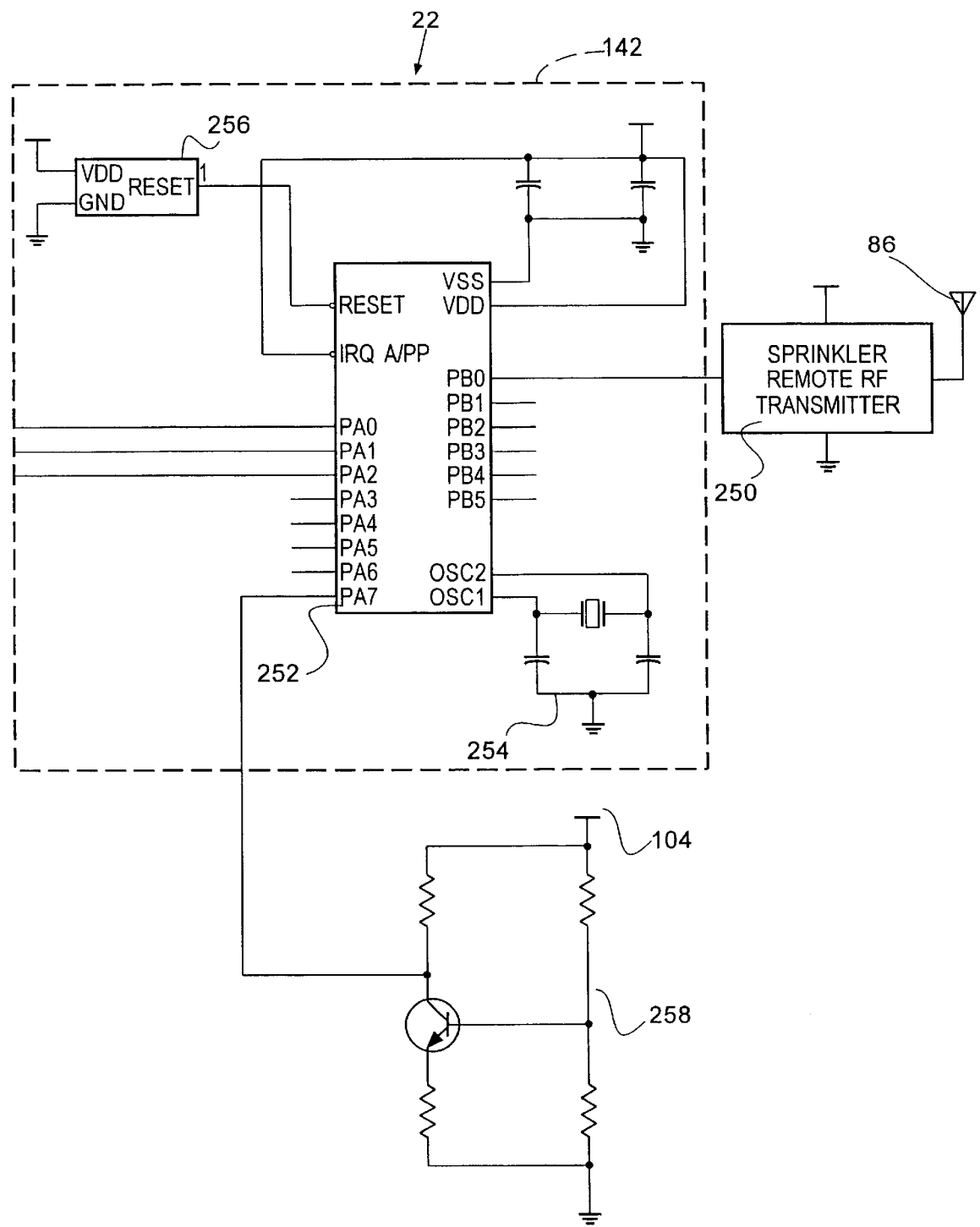

FIGS. 12A and 12B are a circuit diagram of the hose valve unit 22. The signal is detected by the antenna 86 which is coupled to a receiver circuit 250. The receiver circuit 250 inputs the signal to the control unit 142. The control unit 142 has a processor 252. The processor 252 in the preferred embodiment is a Motorola Model HC68HC705, although any suitable microprocessor or microcontroller may be used. A clock circuit 254 is coupled to the processor 252. A reset circuit 256 is also coupled to the processor 252 to clear processor memory on power-up of the system. The processor 252 keeps track of elapsed time in order to close the valve 122. The processor 252 may also drive the optional display to show the time as explained above.

A battery low circuit 258 is coupled to the processor 252 and the batteries 104. The battery low circuit 258 will send a signal to the processor 252 when the batteries 104 reach a low voltage level. The processor 252 will then lock the actuator 112, preventing actuation of the valve 122, if the valve 122 is closed. If the valve 122 is open, the processor 252 will power the actuator 112 to close the valve 122, preventing water flow to the hose 28.

The processor 252 outputs a forward signal and a reverse signal for opening and closing the valve 122. The two output lines are coupled to an H-bridge circuit 260. The H-bridge circuit 260 includes the actuator 112, which is a DC motor in the preferred embodiment. The forward signal is coupled to a predriver circuit 262, which is coupled to a MOSFET 264. A MOSFET 266 completes the forward circuit. Similarly, the reverse output line is coupled to a predriver circuit 268 which is coupled to a MOSFET 270. A MOSFET 272 completes the reverse circuit. The actuator 112 has a positive terminal 274 coupled to MOSFETs 264 and 272. The actuator also has a negative terminal 276 coupled to MOSFETs 270 and 266.

When the processor 252 sends a forward or open signal, the MOSFETs 264 and 266 are turned on and the MOSFETs 270 and 272 are turned off, creating current flow through the actuator 112 from positive terminal 274 to negative terminal 276, thus opening the valve 122. When the processor 252 sends a reverse or close signal, the MOSFETs 264 and 266 are turned off and the MOSFETs 270 and 272 are turned on, creating current flow through the actuator 112 from negative terminal 276 to positive terminal 274, thus closing the valve 122.

The H-bridge circuit 260 also is coupled to the limit switch 128. The limit switch 128 is a mechanical switch which will be turned off when the ball valve 122 reaches a maximum open or closed position. The limit switch 128 is coupled to an input of the processor 252 and will cause the processor 252 to shut off power to the actuator 112. It is to be understood that other circuit configurations or components may be used for the H-bridge circuit 160. For example, rather than using MOSFETs, BJTs or other switch devices may be used. Additionally, a current limiter circuit could be used for the limiter switch 128.

Figure 13:
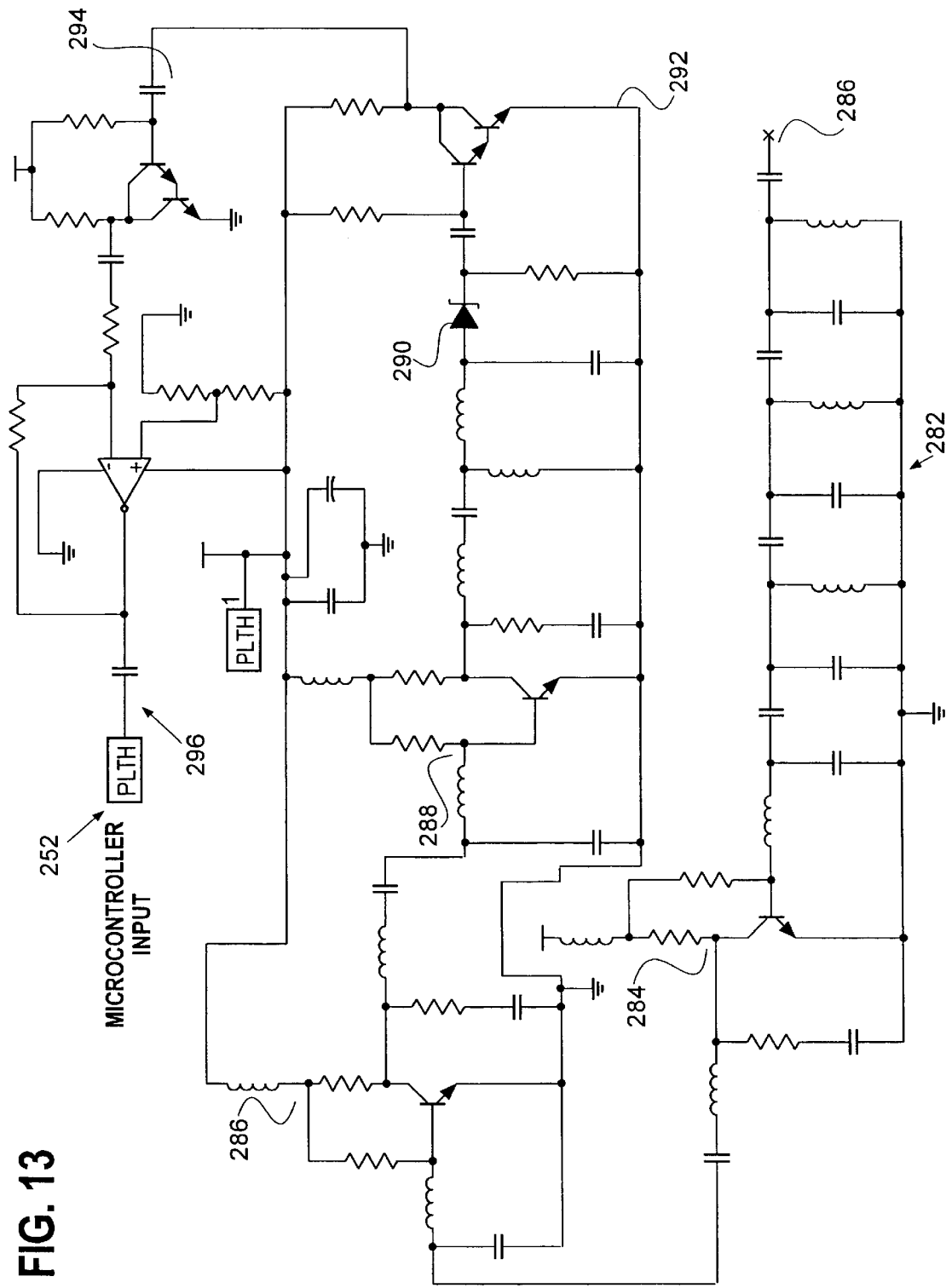
FIG. 13 is a circuit diagram of the receiver in the hose valve unit of FIG. 12.

FIG. 13 is a circuit diagram of the receiver 250. The receiver 250 receives the signal through the antenna 86. The antenna 86 is coupled to a filter circuit 282. The filter circuit is coupled to an amplifier circuit 284 which amplifies the signal. The output is coupled to a second amplifier circuit 286, which is coupled to a third amplifier circuit 288. A detector diode 290 filters the signal by cutting off the negative half cycles of the intermediate frequency signals. The signal is then sent to a gain amplifier 292, which is coupled to a second gain amplifier 294. The signal is then sent to a third gain amplifier 296 and input to the processor 252.

Figure 14:
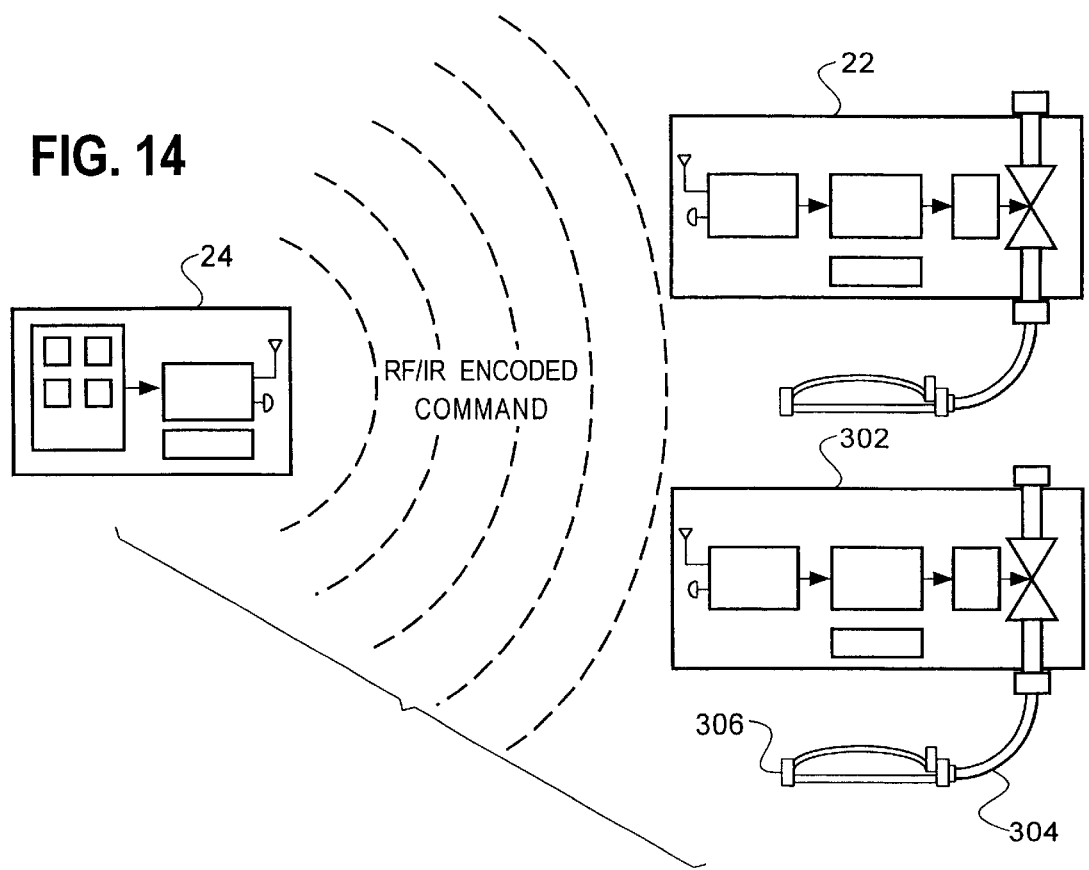
FIG. 14 is a block diagram of an alternate embodiment of the remote control valve system according to the present invention.

FIG. 14 is a block diagram of an alternate embodiment of the present invention. The like elements in FIG. 14 have the same element numbers as the elements in the irrigation system 20 in FIG. 1. A second hose valve unit 302 is fluidly connected to a hose 304 in order to provide water to a second sprinkler 306. The hose valve unit 302 responds to address code signals which differ from those of the command signal for the first hose valve unit 22. Thus, different areas may be irrigated by remote control of the hose valve unit 22 and the hose valve unit 302.

Figure 15:
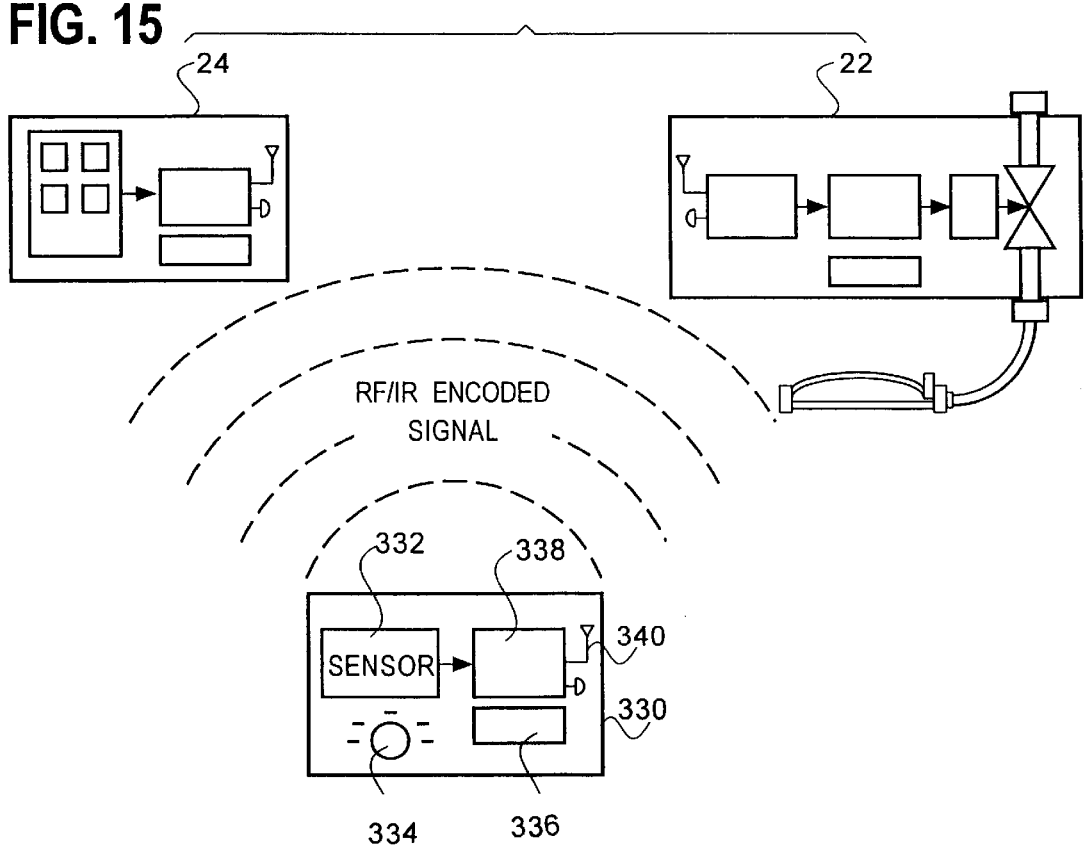
FIG. 15 is a block diagram of a second alternative embodiment of the present invention.

A second alternate embodiment of the present invention is shown in FIG. 15. The embodiment in FIG. 15 includes a moisture sensor 330. The moisture sensor 330 has a transducer 332 which creates a signal in response to sensed moisture. A control selector 334 may be used to select the sensitivity of the transducer 332. The moisture sensor 330 is powered by a battery 336 which is coupled to a transmitter 338. The transmitter 338 transmits a command signal via an antenna 340 to turn off the hose valve unit 22 when moisture exceeds the selected sensitivity. The moisture sensor 330 may be used to control the hose valve unit 22 instead of the remote control 24. In this manner, a user may allow watering through the sprinkler 30 to occur until a desired level of moisture has been achieved by setting the moisture sensor 330. Alternatively, the moisture sensor 330 may serve as a backup to stop watering if the area being watered becomes oversaturated with water.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A remote controlled hose valve system for use with a water source and a hose having a connector and end connectable to a fluid activated device and an opposite connector end, the hose valve system comprising:
   a valve unit having:
      an inlet coupler connectable to the water source;
      a hose coupler coupled to the opposite connector end of the hose;
      a conduit allowing fluid flow between the inlet coupler and the hose coupler;
      a valve in the conduit, permitting fluid flow in the conduit;
      an actuator connected to the valve;
      a power source;
      a signal receiver coupled to the power source and the actuator, the receiver allowing power flow to the actuator to modulate the valve in any position between an open position and a closed position in response to a unique signal; and
   a remote control unit including a transmitter which sends a unique signal to modulate the valve in any position between the open and closed positions to regulate the flow rate of the fluid flowing in the conduit.

2. The remote controlled valve system of claim 1 wherein the valve is a dual solenoid push-pull diaphragm valve with an axial conduit.

3. The remote controlled valve system of claim 1 wherein the valve is a ball valve.

4. The remote controlled valve system of claim 3 wherein the ball valve has a circular opening to the conduit.

5. The remote controlled valve system of claim 3 wherein the ball valve has a non-circular opening to the conduit shaped to appropriate proportional flow.

6. The remote controlled valve system of claim 1 wherein the actuator is controllable by the signal receiver to open the valve to variable positions to cause different flow rates of fluid through the conduit.

7. The remote controlled valve system of claim 1 wherein the actuator comprises an electric motor.

8. The remote controlled valve system of claim 5 wherein the actuator further includes a series of gears coupling the electric motor to the valve.

9. The remote controlled valve system of claim 1 wherein the actuator is a stepper motor.

10. The remote controlled valve system of claim 1 wherein the signal receiver and transmitter receive and transmit RF signals.

11. The remote controlled valve system of claim 1 wherein the signal receiver and transmitter receive and transmit infra-red signals.

12. The remote controlled valve system of claim 1 wherein the remote control unit further includes:
   a processor; and
   a user input device coupled to the processor which allows a user to control the transmission of signals to the hose valve unit.

13. The remote controlled valve system of claim 12 wherein the user input device is a keypad having time increment keys allowing a user to program a time to keep the valve open to maintain water flow through the conduit.

14. The remote controlled valve system of claim 13 further comprising a display coupled to the processor, wherein the display shows the programmed time and the time remaining for which the valve will stay open.

15. The remote controlled valve system of claim 13 further comprising a display coupled to the receiver, wherein the display shows the programmed time and the time remaining for which the valve will stay open.

16. The remote controlled valve system of claim 1 further comprising a moisture sensing unit, the unit including:
- a moisture sensor;
- a transmitter coupled to the sensor; and
- wherein the transmitter sends a signal to the valve unit to close the valve when moisture exceeds a certain level.

17. The remote controlled valve system of claim 1 further comprising a second valve unit having:
- an inlet coupler connectable to a water source;
- a hose coupler coupled to the opposite connector end of the hose;
- a conduit allowing fluid flow between the inlet coupler and the hose coupler;
- a valve in the conduit, permitting fluid flow in the conduit;
- an actuator connected to the valve;
- a power source;
- a signal receiver coupled to the power source and the actuator, the receiver allowing power flow to the actuator to close or open the valve in response to a second unique signal; and
- wherein the transmitter sends a second unique signal to open or close the valve of the second valve unit.

18. A remote controller for activating a valve having an open position and a closed position to allow or prevent water flow from a water source to a hose, the valve being coupled to an actuator which responds to command signals, the remote controller comprising:
- a signal transmitter;
- a frequency oscillator coupled to the signal transmitter,
- a processor; and
- a user input coupled to the processor, the user input providing activation of the processor to send a signal modulated by the frequency oscillator to activate the valve to any position between the open position and the closed position to regulate the flow rate of the water.

19. The remote controller of claim 18 wherein the user input device is a keypad having time increment keys allowing a user to enter a watering time; and wherein the processor includes a timing circuit which sends a first signal to activate the valve and a second signal to close the valve when the watering time has elapsed.

20. The remote controller of claim 19 further comprising a display coupled to the processor, wherein the display shows the programmed time and the time remaining for which the valve will stay open.

21. The remote controller of claim 18 wherein the transmitter is an RF signal transmitter.

22. The remote controller of claim 18 wherein the transmitter is an infra-red signal transmitter.

23. A remote controlled hose valve system for use with a water source and a hose having one connector end connectable to a fluid activated device and an opposite connector end, the system comprising:
- a valve unit having:
  - an inlet coupler connectable to the water source;
  - a hose coupler coupled to the opposite connector end of the hose;
  - a conduit allowing fluid flow between the inlet coupler and the hose coupler;
  - a ball valve in the conduit, the ball valve rotatable between an on position to permit fluid flow in the conduit and an off position to cut off fluid flow in the conduit;
  - a motor having a rotatable shaft coupled to the ball valve,
  - a signal receiver coupled to the motor, the receiver allowing power flow to the motor to rotate the ball valve in response to a unique signal; and
- a remote control unit, having;
  - a user input allowing a user to rotate the ball valve; and
  - a transmitter coupled to the user input which sends a unique signal to rotate the ball valve to any position between the on and off positions to modulate the fluid flow rate to the conduit.

24. A remote controlled valve system for use with a water source and a fluid activated device, the remote controlled valve system comprising:
- a valve unit having:
  - an inlet coupler connectable to the water source;
  - a outlet coupler fluidly connectable to the fluid activated device;
  - a conduit allowing fluid flow between the inlet coupler and the outlet coupler;
  - a valve in the conduit, the valve having an off position to cutoff fluid flow in the conduit and an on position permitting fluid flow in the conduit;
  - an actuator connected to the valve;
  - a power source;
  - a signal receiver coupled to the power source and the actuator, the receiver allowing power flow to the actuator to position the valve between an open and closed position in response to a unique signal; and
- a remote control unit including a transmitter which sends a unique signal to position the valve between the on and off positions to modulate the flow rate of the fluid flowing to the outlet coupler.

* * * * *